United States Patent
Chae et al.

(10) Patent No.: US 10,560,888 B2
(45) Date of Patent: Feb. 11, 2020

(54) METHOD AND APPARATUS OF A WIRELESS PREFETCHING

(71) Applicant: LG ELECTRONICS INC., Seoul (KR)

(72) Inventors: Hyukjin Chae, Seoul (KR); Bonghoe Kim, Seoul (KR); Kaibin Huang, Hong Kong (CN); Seungwoo Ko, Hong Kong (CN)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/060,516

(22) PCT Filed: Dec. 12, 2016

(86) PCT No.: PCT/KR2016/014532
§ 371 (c)(1),
(2) Date: Jun. 8, 2018

(87) PCT Pub. No.: WO2017/099549
PCT Pub. Date: Jun. 15, 2017

(65) Prior Publication Data
US 2018/0368055 A1    Dec. 20, 2018

Related U.S. Application Data

(60) Provisional application No. 62/265,995, filed on Dec. 11, 2015.

(51) Int. Cl.
*H04W 48/10*    (2009.01)
*H04W 76/11*    (2018.01)
(Continued)

(52) U.S. Cl.
CPC ........... *H04W 48/10* (2013.01); *H04L 1/0061* (2013.01); *H04W 48/12* (2013.01); *H04W 48/16* (2013.01); *H04W 76/11* (2018.02); *H04W 76/27* (2018.02)

(58) Field of Classification Search
CPC ..... H04W 48/10; H04W 76/11; H04W 76/27; H04L 1/0061
See application file for complete search history.

(56) References Cited

U.S. PATENT DOCUMENTS

2008/0192688 A1* 8/2008 Kuo ...................... H04W 76/11
370/329
2010/0257228 A1* 10/2010 Staggs .................. G06F 9/5027
709/203

(Continued)

FOREIGN PATENT DOCUMENTS

EP          2866506 A1    4/2015
WO     2014205713 A1    12/2014

*Primary Examiner* — Siming Liu
(74) *Attorney, Agent, or Firm* — Dentons US LLP

(57) ABSTRACT

The object of the present invention can be achieved by providing a method of a wireless prefetching of an user equipment (UE) for a program comprising a plurality of stages including at least one task, in a wireless communication system, the method comprising: receiving a broadcast message including a list of supported service; transmitting a RRCConnectionRequest message to the eNB with a establishmentCause as computation offloading for a program of a service included in the list; receiving a RRCConnectionSetupComplete in response to the RRCConnectionRequest; transmitting bits for a first task that is necessary for stage K; transmitting bits for a second task that is included in stage K+1 before completion of the stage K; and, receiving a result for the stage K and for the second task.

10 Claims, 9 Drawing Sheets

(51) Int. Cl.
*H04L 1/00* (2006.01)
*H04W 76/27* (2018.01)
*H04W 48/12* (2009.01)
*H04W 48/16* (2009.01)

(56) References Cited

U.S. PATENT DOCUMENTS

2014/0331231 A1 11/2014 Scheuermann et al.
2015/0351024 A1 12/2015 Jang et al.

* cited by examiner

FIG. 9
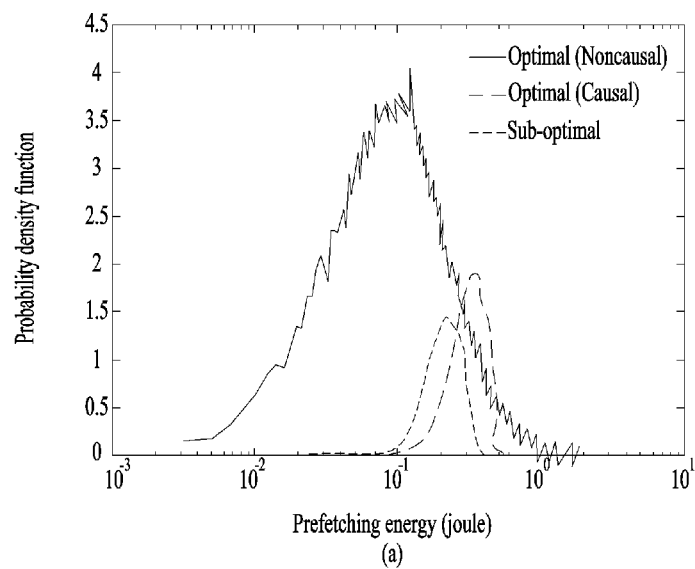
(a)
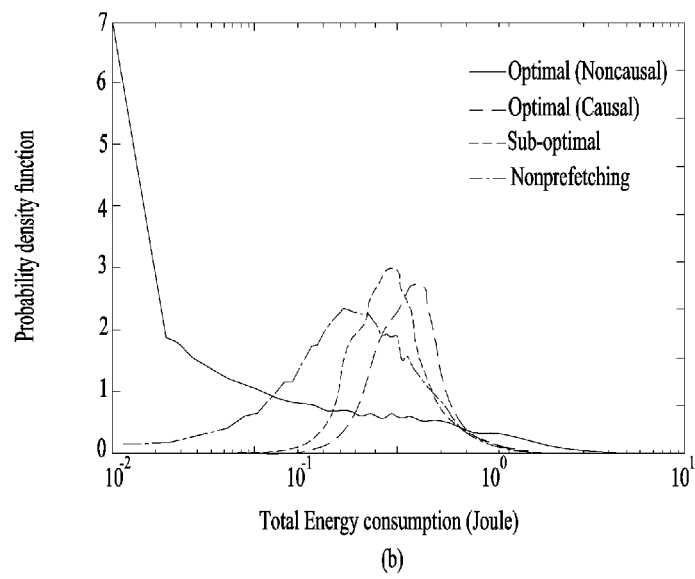
(b)

US 10,560,888 B2

METHOD AND APPARATUS OF A WIRELESS PREFETCHING

This application is a 35 USC § 371 National Stage entry of International Application No. PCT/KR2016/014532 filed on Dec. 12, 2016, and claims priority to U.S. Provisional Application No. 62/265,995 filed on Dec. 11, 2015, all of which are hereby incorporated by reference in their entireties as if fully set forth herein.

TECHNICAL FIELD

The present invention relates to a wireless communication system, and more particularly, to a method and apparatus for wireless prefetching.

BACKGROUND ART

Recently, the number of computation intensive programs increases exponentially. It requires the high-quality computation hardwares and large amount of energy, whereas the computation capability and the battery capacity of mobile devices are restricted. To resolve this issue, mobile computation offloading (MCO) is the one of hottest research topics. A mobile offloads some part of or the entire program to the cloud server, and the program is remotely executed in the could server. As a result, the mobile can save its computation energy.

DISCLOSURE

Technical Problem

The technical task of the present invention is to provide an optimal prefetching rule under non-causal CSI case, Higher-priority-First-Prefetching (HPFP) policy that maintains this prefetching priority at all times which is proved to optimality and a suboptimal prefetcher.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

The object of the present invention can be achieved by providing a method of a wireless prefetching of an user equipment (UE) for a program comprising a plurality of stages including at least one task, in a wireless communication system, the method comprising: receiving a broadcast message including a list of supported service; transmitting a RRCConnectionRequest message to the eNB with a establishmentCause as computation offloading for a program of a service included in the list; receiving a RRCConnectionSetupComplete in response to the RRCConnectionRequest; transmitting bits for a first task that is necessary for stage K; transmitting bits for a second task that is included in stage K+1 before completion of the stage K; and, receiving a result for the stage K and for the second task.

In another aspect of the present invention, provided herein is an user equipment (UE) performing a wireless prefetching for a program comprising a plurality of stages including at least one task, in a wireless communication system, the UE comprising: a receiving device; a transmitting device; and a processor, wherein the processor is configured to receive a broadcast message including a list of supported service, transmit a RRCConnectionRequest message to the eNB with a establishmentCause as computation offloading for a program of a service included in the list, receive a RRCConnectionSetupComplete in response to the RRCConnectionRequest, transmitting bits for a first task that is necessary for stage K, transmit bits for a second task that is included in stage K+1 before completion of the stage K and receive a result for the stage K and for the second task.

Whether the second task is necessary task for the stage K+1 is determined after completion of the stage K.

The UE receives a RRCConnectionReconfiguration message for the bits for the second task.

The RRCConnectionReconfiguration message includes a packet size configuration, the number of packet for prefetching and computation time for one task.

If the second task is necessary task for the stage K+1, the UE uses the result for the second task, and wherein if the second task is not necessary task for the stage K+1, the UE abandon the result for the second task.

The bits for a second task is $$f(i)^* = \left[ B(i) - \left( \frac{\mu^* g_0}{\lambda n p(i)} \right)^{\frac{1}{n-1}} \right]^+.$$

wherein $\mu^*$ is an optimal Lagragian multiplier satisfies $$\sum_{t=1}^{T} b_t^* = \sum_{i=1}^{L} f(i)^*,$$

$b^*_t$ is transmitted bits at t and $$b_t^* = \left( \frac{\mu^* g_t}{\lambda n} \right)^{\frac{1}{n-1}},$$

$f(i)^*$ is the bits for a second task, $B(i)$ is a size of required data for task i, $g_t$ is channel gain at time t, $\lambda$ is energy coefficient, $p(i)$ is a branch probability, L is the number of tasks, T is time slots.

Advantageous Effects

According to the present invention, expected energy consumption for the proposed MCO architecture is minimized.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 9 show probability density functions (PDFs) of energy consumption for prefetching.

BEST MODE

Figure 1:
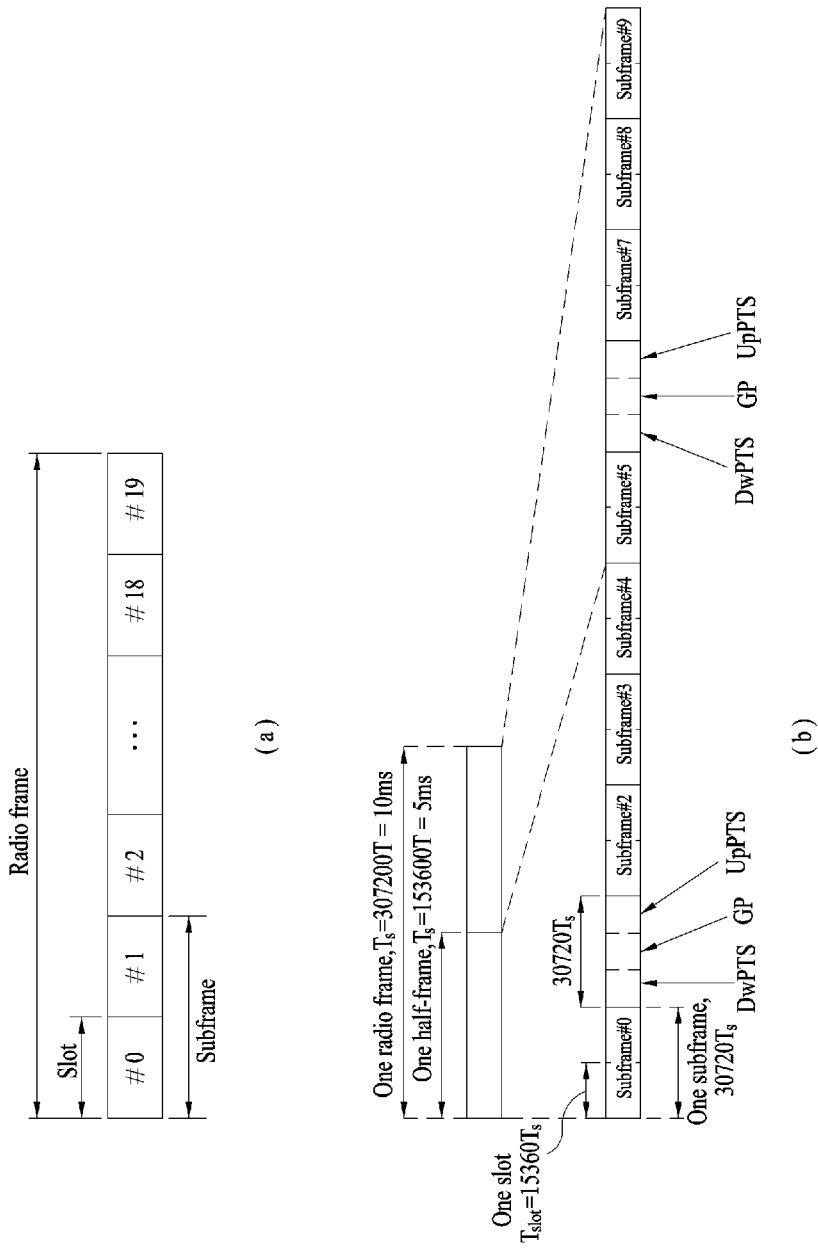
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station,' "Node-B,' "eNode-B (eNB),' and "access point'. The term "relay" may be replaced with such terms as "relay node (RN)' and "relay station (RS)'. The term "terminal" may also be replaced with such terms as "user equipment (UE),' "a mobile station (MS),' "mobile subscriber station (MSS)' and "subscriber station (SS)'.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(*a*) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
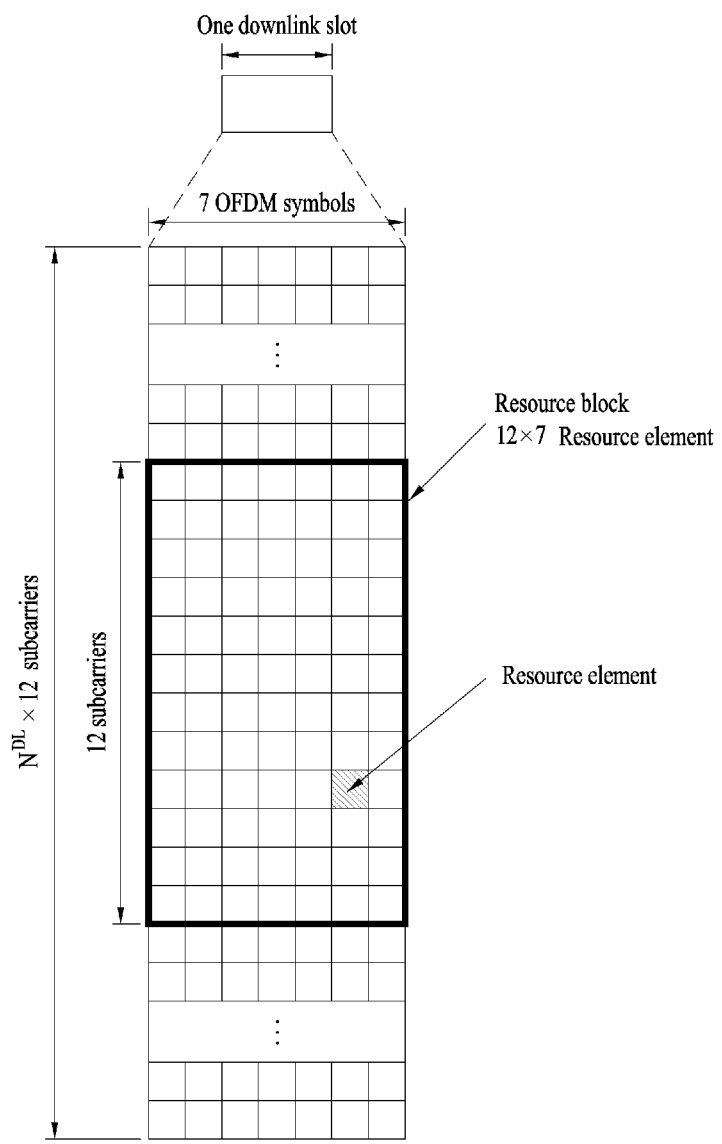
FIG. 2 illustrates a structure of a downlink resource grid for the duration of one downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
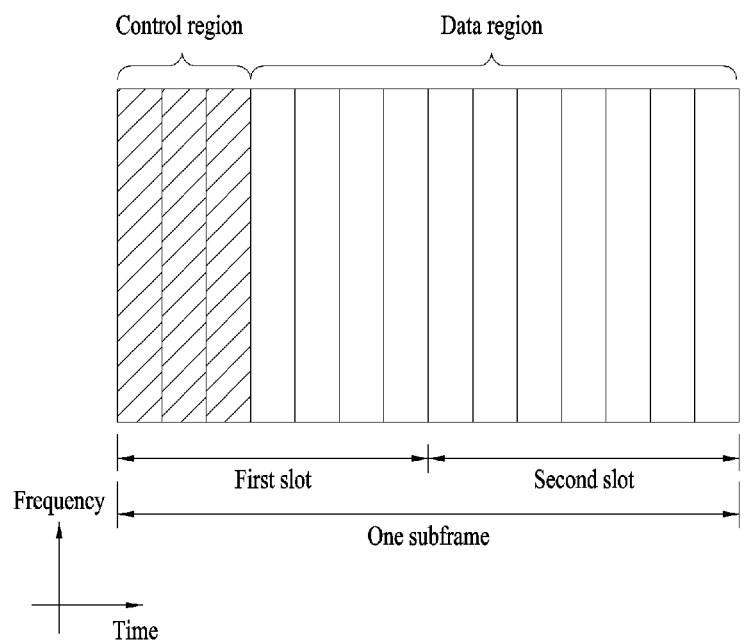
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
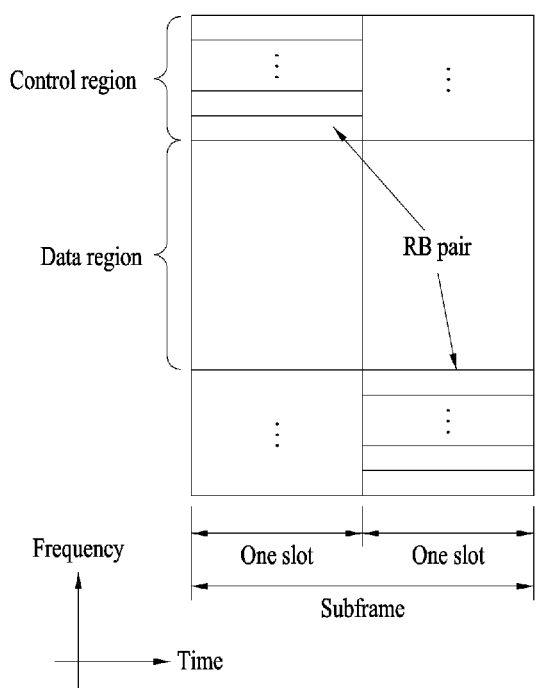
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Hereinafter, a wireless prefetching related to MCO of present invention is disclosed. In the following description, the mobile can send portions of some tasks to the cloud in advance during the execution period of stage K, despite not knowing necessary task for stage K+1. This is referred to as prefetching. If the UE does know necessary information for the next stage, the UE performs prefetching for the remaining stages via the profile of the program. In order to perform a prefetching, the eNB can calculate which kinds of information are necessary and how many bits of each information are prefetched. The mobile can send the remaining part for task i, if task i is selected to be executed at stage K+1, after the execution period of stage K. This is referred as demand fetching. If the UE does know necessary information for the next stage, it performs a demand fetching for the next stage. Vectors are written in bold, e.g. a vector x. The operation E[X] denotes the expected value of a random variable X. The operation $[x]^+$ denotes max(0,x). The notation $\{x_t\}_{t=a}^{b}$ represents a sequence of $x_t$ from t=a to b.

Figure 5:
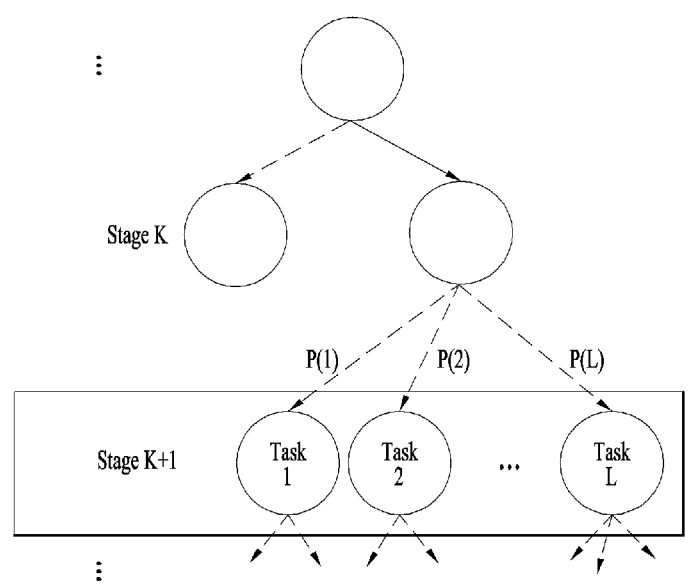
FIG. 5 illustrates a structure of one program for a service.

In order to offload computational tasks to the cloud server within a given deadline, a UE can deliver the required data for future tasks to the cloud server in advance when the channel condition is good. It can reduce not only the energy consumption to offload a task but also computation time. To achieve the above goal, a wireless prefetching architecture, which 1) predicts the future state, 2) discovers the required data for the future state, and 3) deliver portion of the required data to the cloud server in advance can be provided. As shown in FIG. 5, most programs are designed to be running through multiple stages, and the result of the previous stages influence the current stage. For example, when executing augmented reality (AR) or virtual reality (VR)

programs, which kinds of information will be visualized on the screen depends on the past information seen by a user. This means that a mobile (UE) can recognize which kinds of data is necessary at the next stage even after the execution of the current stage is finished. When the mobile offloads the previous stages to the cloud server, it should wait the result of the offloaded stages until their computations are finished. If the channel state is bad at that point, a mobile should consume the large amount of energy to offload the next stage. Otherwise, it does not guarantee the deadline requirement. During the execution time in the cloud server, if a mobile can predict which kind of data is required for the next stage, it can prefetch the required data to the cloud server in advance. By so doing, the mobile can offload data during more longer time, yielding the decrease of the energy consumption. The prediction is based on the profile of the program, i.e., number of tasks at the corresponding stage, the usage history of each task, and the required data size of each task. Based on the profile, how many bits are prefetched for each task can be optimized.

Figure 6:
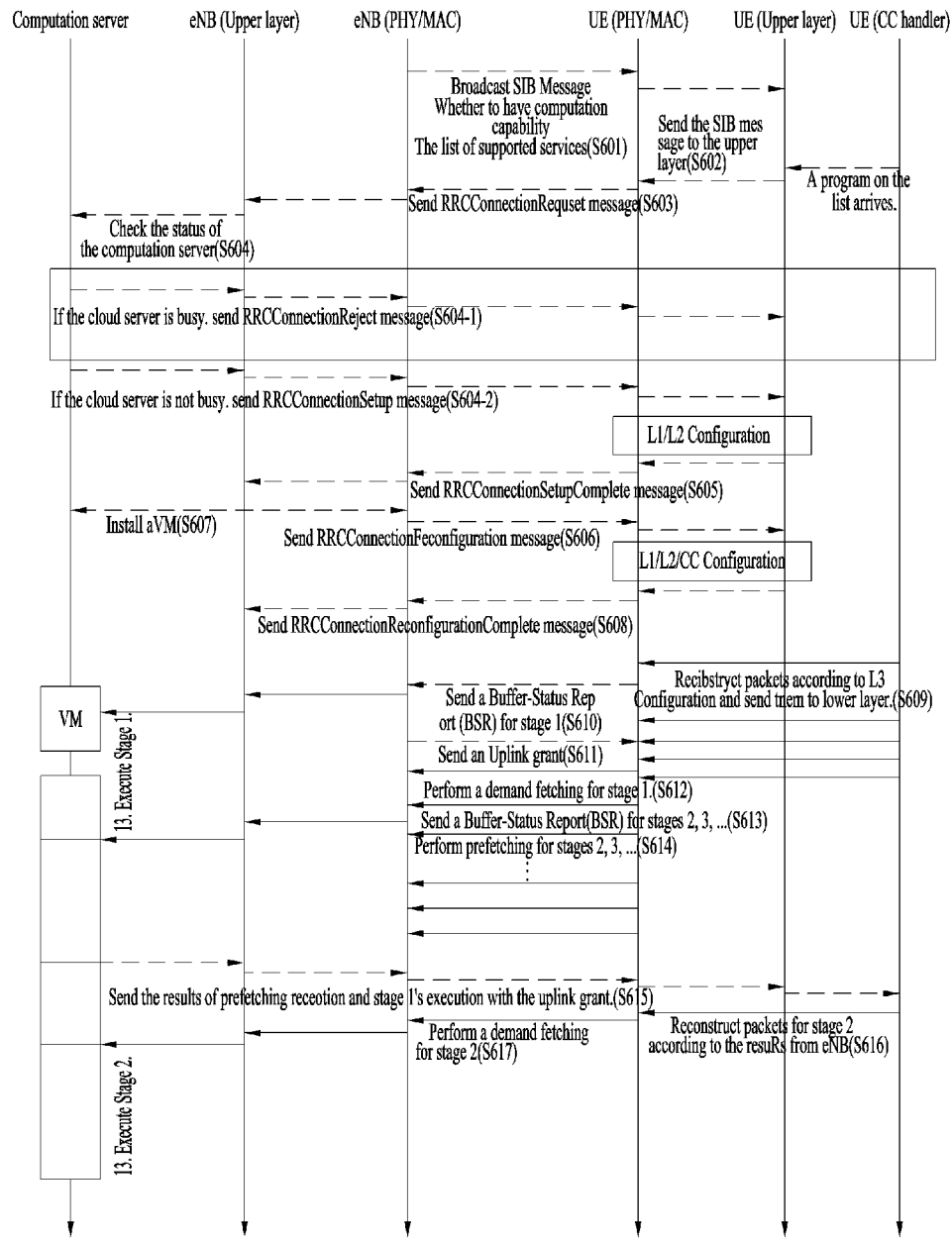
FIG. 6 shows signaling exchange among UE, eNB and computation server according to present invention.

FIG. 6 shows signaling exchange among UE, eNB and computation server according to present invention. Referring to FIG. 6, in a step S601, a eNB connected to the cloud server broadcasts an indication message. The indication message includes information that the eNB has computational capability and a list of supported service, such as AR, VR and video compression. Therefore, the UE receives the broadcast message including a list of supported service. In a step S602, UE which receives this indication message from eNB submits the message to the upper layer of UE. In a step S603, when the UE wants to run a program in the list, the UE transmits RRCConnectionRequest message to the eNB with establishmentCause as computation offloading for a program of a service included in the list. In a step S604, the eNB then checks its current computational status. If the eNB can support this computation request, the eNB transmits RRCConnectionSetup message to the UE. Otherwise, the eNB transmits RRCConnectionReject message to the UE.

In a step S605, the UE transmits the RRCConnectionSetupComplete message to the eNB, in response to the RRCConnectionSetup. in a step S606, the eNB transmits RRCConnectionReconfiguration message including at least one of packet size configuration, the number of packet for prefetching (for the bits for a second task), computation time for one task. In a step S607, while waiting RRCConnectionReconfigurationComplete, the eNB installs a virtual machine on its computation server. In a step S608, In response to the RRCConnectionReconfiguration message, the UE configures its lower layer and transmits RRCConnectionReconfigurationComplete to the eNB. In a step S609, the UE makes packets for data of stage K according to the received RRCConnectionReconfiguration message and send them to the lower layer. In a step S610, The UE sends a buffer status report (BSR) to the eNB for receiving an uplink grant. The eNB sends an uplink grant to the UE (S611).

In a step S612, the UE transmit bits for a first task that is necessary for stage K. That is, the UE perform a demand fetching for stage K via the uplink grant. In a step S613, after sending stage K, the UE makes packets of data for the remaining stages, and continues transmitting BSR to eNB to receive uplink grants.

In a step S614, the UE transmit bits (f(i)*) for a second task (task i) that is included in stage K+1 before completion of the stage K. As mentioned above, whether the second task is necessary task for the stage K+1 is determined after completion of the stage K. That is, the UE performs prefetching for the remaining stages during the execution of stage K. The uplink grants are used in this step.

In a step S615, after completing the execution of stage K, the eNB sends its result alongside the prefetching results and uplink grant and the UE receives the result for the stage K and for the second task. If the second task is necessary task for the stage K+1, the UE uses the result for the second task, and if the second task is not necessary task for the stage K+1, the UE abandon the result for the second task.

In a step S616, Based on the report from the eNB, the UE reconstructs packets for the remaining part of stage K+1 and submits them to the lower layer. In a step S617, The UE performs a demand fetching for stage K+1 via the pre-received uplink grant. Continue steps S610-617 until the program is finished.

In the above description, the bits for a second task is $$f(i)^* = \left[ B(i) - \left( \frac{\mu^* g_0}{\lambda n p(i)} \right)^{\frac{1}{n-1}} \right]^+ .$$

wherein μ* is an optimal Lagragian multiplier satisfies $$\sum_{t=1}^{T} b_t^* = \sum_{i=1}^{L} f(i)^*,$$

b*$_t$ is transmitted bits at t and $$b_t^* = \left( \frac{\mu^* g_t}{\lambda n} \right)^{\frac{1}{n-1}}, ,$$

f(i)* is the bits (f(i)*) for a second task, B(i) is a size of required data for task i, $g_t$ is channel gain at time t, λ is energy coefficient, p(i) is a branch probability, L is the number of tasks, T is time slots. That is, optimized prefetching data size is provided. Prefetching can be beneficial to reduce energy consumption when the i) information is used with high probability, ii) it has large volume, or iii) the channel stage is good, and demand fetching requires plenty of energy if too much portion remains and the channel falls deep fading.

Hereinafter, how to derive the optimized data size for prefetching is disclosed.

MCO system comprising one mobile and one access point connected to a cloud computation server is considered. The mobile aims to run the program in FIG. 5, but it cannot for itself due to its limited hardware capabilities, such as CPU, memory and battery. The mobile thus offloads tasks to the cloud, and the program is remotely running in the cloud. Each stage has several tasks, one of which will be executed at the corresponding stage. The program follows a Markov property, where the task that will be executed at the next stage depends on the result of current stage. This assumption enables us to focus on two consecutive stages, i.e., stages K and K+1 in FIG. 5. Stage K+1 has L tasks. Let p(i) denote a branch probability of task i <5>, where task i is used with probability p(i). Only one task will be executed at stage K+1, and the following equation 1 is always satisfied.

$$\sum_{i=1}^{L} p(i) = 1. \qquad \text{[Equation 1]}$$

In order to execute a task, specific data is required such as computation codes and input states. Let B(i) denote the size of required data for task i (in bits). The required data for task i is the exclusive use, and those for the others are useless for task i. Assume that the branch probability p(i) and required data size B(i) are known based on the profile of the program. Stage K+1 has two tasks depicted as red (701) and green (702) circles (L=2). During the execution of stage K, the mobile performs prefetching for each task according to channel states. After completing stage K, the mobile recognizes that the red task is necessary for stage K+1, and performs demand fetching for the red one.

Figure 7:
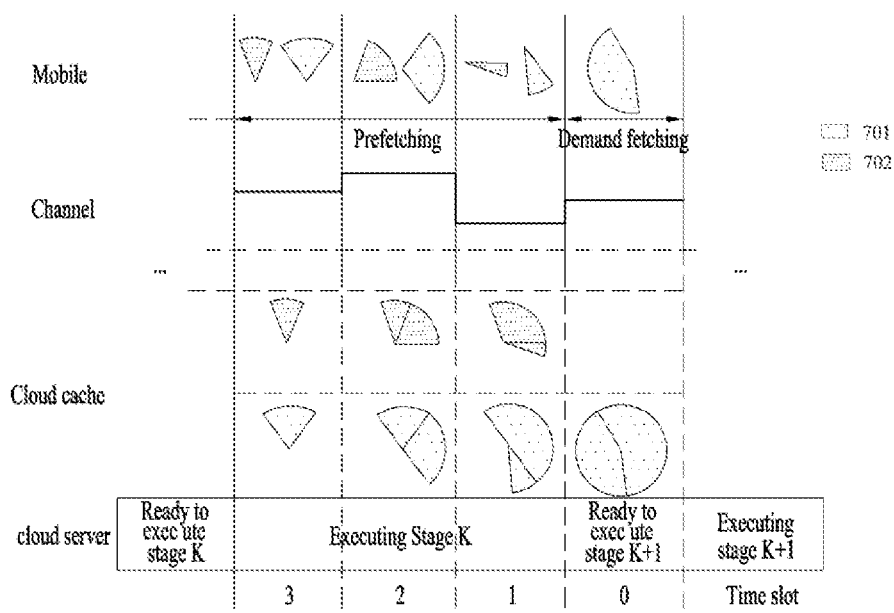
FIG. 7 represents a block diagram of the proposed MCO architecture for showing how to offload tasks to the cloud.

FIG. 7 represents a block diagram of the proposed MCO architecture, showing how to offload tasks to the cloud. As soon as the access point has received a task at stage K from the mobile, the execution of stage K starts. It takes T time slots including loading the task to the cloud server, computing the task, and returning back its result to the mobile. During this T time slots, the mobile does not know which required task is required at K+1 stage. After T time slots, on the other hands, the mobile exactly knows necessary one for stage K+1 because it receives the execution result of stage K from the cloud. Prefetching can reduce the energy cost because the available time for offloading tasks lengthens T+1 time slots. On the other hands, prefetching sometimes wastes energy if the prefetched data is not used based on the result of stage K. As a result, it is vital to balance the prefetching and demand fetching policies by considering the profile of each task, e.g., branch probability p(i) and the size of required data set B(i).

Time is indexed in descending order from t=T to 0. Recall that prefetching is performed from t=T to 1, whereas the remaining data is fetched on demand at t=0. Wireless channels are block fading where channel gains are constant over one time slot, and independently and identically distributed (i. i. d.). The channel gain at time t is denoted by $g_t$. A convex monomial function in [44] is introduced as an energy consumption model. The required energy to transmit $b_t$ bits to the cloud server at t time slot is following equation 2.

$$E_t(b_t, g_t) = \lambda \frac{b_t^n}{g_t}, \qquad \text{[Equation 2]}$$

where n and $\lambda$ represent the monomial order and the energy coefficient, respectively. The monomial order depends on the modulation scheme, and is normally assumed $2 \leq n \leq 5$. $\lambda=1.5$ can be used as in <27>.

We let denote $s_t$ a prefetching vector at t time slot as following equation 3.

$$s_t = [s_t(1), s_t(2), \Lambda, s_t(L)], \qquad \text{[Equation 3]}$$

where $s_t(i)$ represents the amount of prefetched bits for task i at t time slot. Then, the transmitted bits at time slot t is $s_t 1$, where 1 is an L by 1 column vector of which all elements are one. According to equation 2, the energy consumption at time t ($1 \leq t \leq T$) is following equation 4.

$$E_t(s_t 1, g_t) = \lambda \frac{(s_t 1)^n}{g_t}. \qquad \text{[Equation 4]}$$

We create the task status vector at time slot t, $l_t$, as following equation 5.

$$l_t = [l_t(1), l_t(2), \Lambda, l_t(L)] \qquad \text{[Equation 5]}$$

where $l_t(i)$ represents the remaining bits for task i at the beginning of t time slot. The initial vector $l_T$ is [B(1),Λ,B(L)], and $l_t$ can be calculated interatively as $l_t = l_{t+1} - s_{t+1} = l_T - \sum_{k=t+1}^{T} s_t$. Unprefetched bits of each task are expressed in terms of the task status vector $l_0$ as following equation 6.

$$l_0 = [l_0(1), \Lambda, \qquad \text{[Equation 6]}$$
$$l_0(L)] = \left[ B(1) - \sum_{t=1}^{T} s_t(1), \Lambda, B(L) - \sum_{t=1}^{T} s_t(L) \right].$$

In order to fetch task i on demand, $l_0(i)$ bits should be transmitted to the cloud. Given that task i is executed at stage K+1, the energy consumption at t=0 is following equation 7.

$$E_0(l_0(i), g_0) = \lambda \frac{l_0(i)^n}{g_0}. \qquad \text{[Equation 7]}$$

A prefetcher has causal channel state information (CSI) <13>, where at time t, $g_T$, $g_{T-1}$, Λ, $g_t$ g are known but $g_{t-1}$, Λ, $g_0$ are unknown. In this context, the optimal energy-efficient prefetcher decides a sequence of prefetched data ($\{s_t\}_{t=1}^{T}$) that minimizes the expected energy consumption from t=T to 0 as following Problem 1:

$$\underset{\{s_t\}}{\text{minimize}} \, E \left[ \sum_{t=1}^{T} E_t(s_t 1, g_t) + \sum_{i=1}^{L} I(i) \cdot E_0(l_0(i), g_0) \right], \qquad \text{[Problem 1]}$$

$$\text{subject to } \sum_{t=1}^{T} s_t \leq 1_T,$$

$$s_t \geq 0, \forall \, i.$$

The indicator function I(i) in P1 becomes one when task i is executed at stage K+1. Otherwise, it becomes zero.

An optimal prefetcher is designed by solving P1. An optimal prefetching rule under non-causal CSI is disclosed as follows, where all channels are already known at t=T.

Let $b_t$ and f(i) denote the transmitted bits at t and total prefetched bits for task i, respectively ($b_t = \sum_{i=1}^{L} s_t(i), f(i) = \sum_{t=1}^{T} s_t(i)$). Optimization problem P1 can be rewritten in terms of $b_t$ and f(i) as following Problem 2.

$$\underset{\{b_t, f(i)\}}{\text{minimize}} \, \lambda \sum_{t=1}^{T} \frac{b_t^n}{g_t} + \lambda \sum_{i=1}^{L} p(i) \frac{(B(i) - f(i))^n}{g_0}, \qquad \text{[Problem 2]}$$

$$\text{subject to } \sum_{t=1}^{T} b_t = \sum_{i=1}^{L} f(i),$$

$$b_t \geq 0, f(i) \geq 0, \forall \, i, t.$$

Here, the expected value of the indicator function E[I(i)] in P1 is its branch probability p(i), and the first constraint represents that the total transmitted bits over T time slots is the same as the sum of prefetching bits for all tasks.

P2 is a convex optimization because the objective function is expressed as the sum of convex energy consumption functions of equation 2, and all constraints are linear. This convexity enables us to derive the optimal solution by using Karush-Kuhn-Tucker (KKT) conditions, which are known as necessary and sufficient conditions for optimality. Then the main result of this subsection is stated as follows:

The optimal transmitted bits at t, $b^*_t$ is following equation 8. (Theorem 1, Optimal prefetching under non-causal CSI)

$$b^*_t = \left(\frac{\mu^* g_t}{\lambda n}\right)^{\frac{1}{n-1}}, \quad \text{[Equation 8]}$$

and the optimal prefetched bits for task i, f(i)* is following equation 9.

$$f(i)^* = \left[B(i) - \left(\frac{\mu^* g_0}{\lambda n p(i)}\right)^{\frac{1}{n-1}}\right]^+. \quad \text{[Equation 9]}$$

Here, the optimal Lagragian multiplier $\mu^*$ satisfies the following equation 10.

$$\sum_{t=1}^{T} b^*_t = \sum_{i=1}^{L} f(i)^* \quad \text{[Equation 10]}$$

Noting that $b^*_t$ equation 8 and f(i)* equation 9 are respectively increasing and decreasing functions of $\mu^*$, the optimal $\mu^*$ satisfying equation 10 is derived by a fixed point formulation. Longer execution time T makes the left side of equation 10 increase, yielding smaller $\mu^*$. More number of tasks L makes the right side of equation 10 increase, on the other hand, yielding higher $\mu^*$. By the law of large numbers, when the execution time T becomes longer, the sum of the transmitted bits over T time slots $\Sigma_{i=1}^{L} b^*_t(i)$ converges to $$\left(\frac{\mu^* T}{\lambda n}\right) E\left[g^{\frac{1}{n}}\right].$$

The value makes it easy to preallocate the radio resource for prefetching at t=T. According to equation 8, higher monomial order n mitigates the effect of channel fluctuations, resulting in reducing the difference of transmitted bits between each time slot. It is interpreted that the constant bits allocation over T time slots can achieve the near-optimal energy consumption when the modulation order is high.

The sequence of optimal prefetching vector $\{s^*_t\}_{t=1}^{T}$ is derived from Theorem 1. Recalling the relationships between $s^*_t$, $b^*_t$, and f(i)*, we make the following system of linear equations.

$$\sum_{i=1}^{L} s^*_t(i) = b^*_t, \forall t = 1, \Lambda, T, \quad \text{[Problem 3]}$$

$$\sum_{t=1}^{T} s^*_t(i) = f(i)^*, \forall i = 1, \Lambda, L.$$

Note that the number of unknowns and equations in P3 are LT and L+T, respectively. If L or T is one, P3 has one solution because it is an overdetermined system where the equation outnumber the unknown, and the rank of the coefficient matrix is LT. If L and T are larger than one, on the other hands, P3 has infinitely many solutions because it is an underdetermined system where the unknowns outnumber the equations, and the rank of the coefficient matrix is L+T. In other words, there are numerous prefetching policies guaranteeing Theorem 1. Among them, the following Higher-Priority-First-Prefetching (HPFP) policy is suggested.

Task i has higher prefetching priority than task j when the following inequality is satisfied (Definition 3, Higher-Priority-First-Prefetching)

$$P(i)l_t(i)^{n-1} > P(j)l_t(j)^{n-1}, \quad \text{[Inequality 1]}$$

where $l_t(i)$ is the remaining bits at the beginning of t time slot. HPFP policy works on the following principles:

1. If task i is not prefetched, task j is not prefetched either.
2. If task i is prefetched but task j is not, the following inequality should be satisfied:

$$P(i)(l_t(i) - s^*_t(i))^{n-1} \geq P(j)l_t(i)^{n-1} \quad \text{[Inequality 2]}$$

3. If both tasks i and j are prefetched at t, the following equation 11 should be satisfied:

$$P(i)(l_t(i) - s^*_t(i))^{n-1} = P(j)(l_t(j) - s^*_t(j))^{n-1} \quad \text{[Equation 11]}$$

There are three tasks for which required data sizes are in descending order, i.e., B(1)>B(2)>B(3), and all branch probabilities p(i) are identical. The prefetching priority order defined in Inequality 1 is thus the same as the index of each task. The optimal prefetched bits for each task at t, $s^*_t$ is expressed as the area over the threshold $\eta_t$ in Equation 12. It is shown that a task with higher prefetching priority order is prefetched preferentially, and this order holds during entire time slots.

Figure 8:
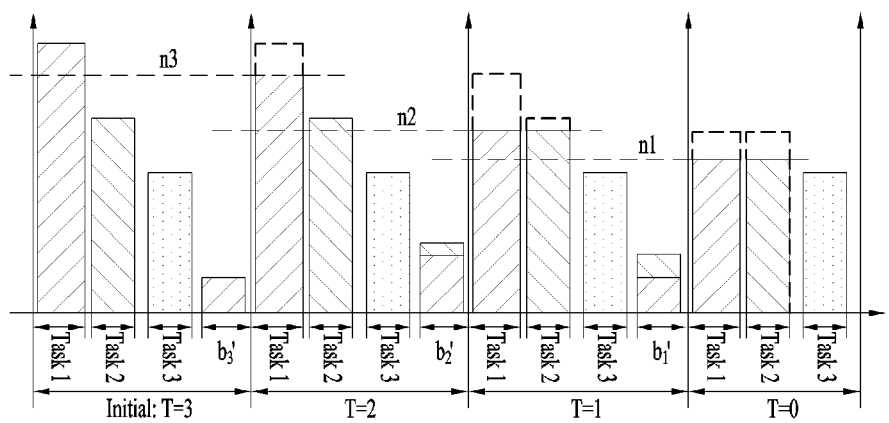
FIG. 8 represents a illustration of wireless prefetching under HPFP policy.

FIG. 8 represents a illustration of wireless prefetching under HPFP policy. Given the optimal transmitted bits $b^*_t$ in Equation 8, the optimal prefetcher calculates $s^*_t(i)$ satisfying the following equation 12:

$$s^*_t(i) = \left(l_t(i) - \left(\frac{\eta_t}{p(i)}\right)^{\frac{1}{n-1}}\right)^+, \quad \text{[Equation 12]}$$

where $b^*_t = \Sigma_{i=1}^{L} s^*_t(i)$. Equation 12 satisfies both conditions Inequality 2 and Equation 11. The threshold $\eta_t$ in Equation 12 chooses prefetched tasks according to Inequality 2, and balances the amount of prefetched bits across the prefetched tasks according to Equation 11.

HPFP policy achieves the optimal prefetching rules in Theorem 1. (Corollary 1)

In the follows, the optimal prefetcher under causal CSI via the dynamic programming (DP) approach is explained. P1 can be rewritten as finding an optimal prefetching vector $s^*_t$ that minimizes the sum of current energy consumption at t and expected future energy consumption from t-1 to 0 time slots:

$$\underset{s_t}{\text{minimize}} \lambda \frac{(s_t 1)^n}{g_t} + \bar{J}_{t-1}(l_t - s_t), \quad \text{[Problem 4]}$$

where $\bar{J}_{t-1}(l_{t-1})=E_{g_{t-1}}[J_{t-1}(l_{t-1},g_{t-1})]$ is the cost-to-go function, the expected energy consumption to run stage K+1 when an optimal prefetching policy is used at each time slot.

The sequence of optimal prefetching vectors $\{s_t\}_{t=1}^{T}$ should guarantee the following inequality (Theorem 2, Optimal prefetching condition under causal CSI):

$$p(i)^{\frac{1}{n-1}}\left(B(i)-\sum_{t=1}^{T}s_t^*(i)\right) \leq \left(\sum_{i=1}^{L}s_1^*(i)\right)\left(g_1 E\left[\frac{1}{g}\right]\right)^{-\frac{1}{n-1}}, \quad \text{[Inequality 3]}$$

where the equality is satisfied when task i is prefetched, i.e., $\Sigma_{i=1}^{L} s^*_t(i) > 0$.

The terms inside parentheses of left and right sides mean the remaining bits for task i at $t=0$ and the transmitted bits at $t=1$, respectively. This is in line with the optimal prefetching rules under non-causal CSI in Theorem 1 in the sense that both of the optimal transmitted bits at t ($b^*_t$) and the remaining bits at $t=0$ ($B(i)-f(i)^*$) are balanced in terms of the common parameter $\mu^*$ (see equation 8 and 9).

HPFP policy achieves the optimal condition Inequality 3 in Theorem 2 (Corollary 2). The corollary 2 informs that the optimal prefetching vector $s^*_t$ can be derived from the optimal transmitted bits $b^*_t = \Sigma_{i=1}^{L} s^*_t(i)$ by HPFP policy, as in case of non-causal CSI.

The remaining is to derive the optimal transmitted bits $b^*_t$. To this end, the backward iteration can be used. Consider $t=1$. Noting that the remaining bits at $t=1$, $l_1(t)$ is expressed in terms of the previous prefetching decisions, i.e., $l_1(t)=B(i)-\Sigma_{t=2}^{T} s^*_t(i)$, $b^*_1$ can be derived as following equation 13, $$b_1^* = \sum_{i=1}^{L} s_1^*(i) = \sum_{i \in A} s_1^*(i) = \frac{\sum_{k \in A} l_1(k)}{1+\left(g_1 E\left[\frac{1}{g}\right]\right)^{-\frac{1}{n-1}}\left(\sum_{k \in A} p(k)^{-\frac{1}{n-1}}\right)}, \quad \text{[Equation 13]}$$

where A represents the set of prefetched tasks. Inserting equation 13 into P4 at $t=1$, we can obtain $J_1(l_1,g_1)$ as following equation 14.

$$J_1(l_1, g_1) = \frac{\lambda\left(\sum_{k \in A} l_1(k)\right)^n}{\left(g_1^{\frac{1}{n-1}}+E\left[\frac{1}{g}\right]^{-\frac{1}{n-1}}\left(\sum_{k \in A} p(k)^{-\frac{1}{n-1}}\right)\right)^{n-1}} + \lambda E\left[\frac{1}{g}\right]\left(\sum_{i \notin A} p(i) l_1(i)^n\right). \quad \text{[Equation 14]}$$

The cost-to-go function $\bar{J}_1(l_1)$ can be derived by integral over $g_1$ as following equation 15, $$\bar{J}_1(l_1) = \int_0^{\infty} J_1(l_1,g_1) dg_1. \quad \text{[Equation 15]}$$

The optimal prefetching vector $b^*_t$ can be obtained by solving the optimization problem P4 where $\bar{J}_1(l_1)$ of Equation 15 is applied. Unfortunately, the closed form expression of $b^*_2$ cannot be derived because the prefetching set A in Equation 14 depends on the channel gain $g_1$ and the task status vector $l_1$. There is no choice but to find the optimal $b^*_2$ numerically, but it requires large computation complexity.

More importantly, finding $b^*_3,\Lambda,b^*_T$ increases the complexity exponentially because of so called the curse of dimensionality. Since the closed form expression of the optimal prefetching vector $s^*_t$ cannot be derived, it is of interest to develop suboptimal prefetchers. The prefetching set A of Equation 14 is given at $t=1$, whereas it is unknown at $t\geq 2$ because of its dependency on future channel states $g_{t+1},\Lambda,g_1$. If we predict A properly at $t\geq 2$, on the other hands, the closed form of the optimal transmitted bits $b^*_t(A)$ can be derived as stated in the following theorem.

Theorem 3: Given the prefetching set A, the optimal transmitted bits of P4, $b^*_t(A)$ is following equation 16, $$b_t^*(A) = \begin{cases} \dfrac{g_t^{\frac{1}{n-1}}\beta_t(A)}{g_t^{\frac{1}{n-1}}+\left(\frac{1}{\xi_{t-1}(A)}\right)^{-\frac{1}{n-1}}}, & \text{if } t \geq 2 \\[2ex] \dfrac{g_1^{\frac{1}{n-1}}\beta_1(A)}{g_1^{\frac{1}{n-1}}+E\left[\frac{1}{g}\right]^{-\frac{1}{n-1}}\left(\sum_{k \in A} p(k)^{-\frac{1}{n-1}}\right)} & \text{if } t = 1 \end{cases} \quad \text{[Equation 16]}$$

where $\beta_t(A)$ is the sum of remaining bits for the tasks in A, i.e., $\beta_t(A)=\Sigma_{k \in A} l_t(k)$, and $$\xi_t(A) = \begin{cases} E_g\left[\left\{g^{\frac{1}{n-1}}+\left(\frac{1}{\xi_{t-1}(A)}\right)^{-\frac{1}{n-1}}\right\}^{-(n-1)}\right] & \text{if } t \geq 2 \\[2ex] E_g\left[\left(g^{\frac{1}{n-1}}+E\left[\frac{1}{g}\right]^{-\frac{1}{n-1}}\left(\sum_{k \in A} p(k)^{-\frac{1}{n-1}}\right)\right)^{\frac{1}{n-1}}\right] & \text{if } t = 1 \end{cases}$$

The terms $$g_1^{\frac{1}{n-1}} \text{ and } \left(\frac{1}{\xi_{t-1}(A)}\right)^{\frac{1}{n-1}}$$

in Equation 16 mean current and future channel effects, respectively. In this context, the optimal transmitted bits $b^*_t(A)$ represents the ratio of the current channel effect to the sum of current and futures ones. As the monomial order increases, coefficient $\xi_t(A)$ of Equation 16 is a recursive form derived from the former one $\xi_{t-1}(A)$, and its computation complexity increases as t becomes higher. Once $\xi_T(A)$ is derived at $t=T$, however, there is no additional computation until $t=1$ because it is independent of channel state realizations $g_T$, $g_{T-1}$, $\Lambda$, $g_1$. Coefficients $\xi_t(A)$, $t<T$, are already derived when calculating $\xi_T(A)$.

The remaining is how to decide a feasible prefetching set A. To this end, it is assumed that task are sorted by prefetching priority order of Inequality 1 and the index of each task means its order as $\gamma_t(1)\geq\gamma_t(2)\geq\Lambda\geq\gamma_t(L)$, where $$\gamma_i(i) = p(i)^{\frac{1}{n-1}} l_t(i).$$

Recall that the prefetching priority order $\gamma_t(1)\geq\gamma_t(2)\geq\Lambda\geq\gamma_t(L)$, is not changed due to the HPFP policy. The number of elements of A, denoted as |A|, is thus interpreted as the index of the lowest priority task among prefetched ones.

The prefetching set A is feasible when the following Inequality 4 is satisfied (Corollary 3):

$$U_t(|A|-1) < \sum_{t=1}^{T} b_t^*(A) \le U_t(|A|), \quad [\text{Inequality 4}]$$

where $U_t(|A|)$ is the maximum transmitted bits to prefetch up to $|A|$ tasks, $$U_t(|A|) = \sum_{i=1}^{|A|} l_i(i) - \gamma_t(|A|+1)p(i)^{-\frac{1}{n-1}}.$$

The sum of the optimal transmitted bits of Equation 16, $\sum_{k=1}^{T} b_k^*(A)$ satisfies the following inequality 5 (Corollary 4):

$$\sum_{k=1}^{T} b_k^*(A) \ge \beta_t(A) \frac{\sum_{k=1}^{t} g_k^{\frac{1}{n-1}}}{g_t^{\frac{1}{n-1}} + \left(\frac{1}{\xi_{t-1}(A)}\right)^{\frac{1}{n-1}}}, \quad [\text{Inequality 5}]$$

where the equality is satisfied when $$g_1^{\frac{1}{n-1}} = g_2^{\frac{1}{n-1}} = \Lambda = g_{t-1}^{\frac{1}{n-1}} = E\left[g^{\frac{1}{n-1}}\right].$$

FIG. 9 show probability density functions (PDFs) of energy consumption for prefetching. Values, L=5, T=3, n=2 are assumed for probability density functions of energy consumption in MCO. Referring FIG. 9(a), the range of the optimal non-causal prefetcher is the largest because it can exploit the feature of time-varying channels over T time slots using the given CSI. On the other hand, the others have only statistical information of future CSIs, and only depend on the current CSI. It is also shown that the sub-optimal causal prefetcher consumes less energy for prefetching than the optimal one. Recall that the proposed sub-optimal prefetcher uses the lower bound Inequality 5 in Corollary 4 as a criteria to find the feasible prefetching set A, making the prefetched bits smaller. The distributions of total energy consumption shown in FIG. 9(b) are similar to each other despite the different prefetching behaviors. It is understood that the total energy consumption is less sensitive to the total prefetched bits.

Proofs of theorems and corollaries that are used above are provided in the follows.

1) Proof of Theorem 1

Define the Lagragian function for optimization problem P2 as $$L = \sum_{t=1}^{T} \lambda \frac{b_t^n}{g_t} + \lambda \sum_{i=1}^{L} p(i) \frac{(B(i)-f(i))^n}{g_0} + \mu\left(\sum_{i=1}^{L} f(i) - \sum_{t=1}^{T} b_t\right) \quad (1)$$

Applying KKT conditions gives:

$$2\frac{\partial L}{\partial b_t^*} = \lambda n \frac{(b_t^*)^{n-1}}{g_t} - \mu \ge 0, \forall t, \quad (2)$$

$$\frac{\partial L}{\partial f(i)^*} = -\lambda np(i) \frac{(B(i)-f(i)^*)^{n-1}}{g_0} + \mu \ge 0, \forall i, \quad (3)$$

$$b_t^*\left(\lambda n \frac{(b_t^*)^{n-1}}{g_t} - \mu\right) = 0, \forall i, \quad (4)$$

$$f(i)^*\left(-\lambda np(i) \frac{(B(i)-f(i)^*)^{n-1}}{g_0} + \mu\right) = 0, \forall i, \quad (5)$$

$$\sum_{i=1}^{L} f(i)^* = \sum_{t=1}^{T} b_t^*. \quad (6)$$

Lemma 1. The optimal transmitted bits $b_t^*$ are strictly positive for all t.

Proof. Unless $b_t^*$ becomes zero, condition (2) is satisfied. According to Lemma 1 and condition (4), we can derive the following equation:

$$b_t^* = \left(\frac{\mu g_t}{\lambda n}\right)^{\frac{1}{n-1}} \quad (7)$$

Next, consider task i where $f(i)^* > 0$. From (5), the optimal prefetching bits for task i $f(i)^*$ becomes $$B(i) - \left(\frac{\mu g_0}{\lambda np(i)}\right)^{\frac{1}{n-1}}.$$

If $f(i)^*=0$ on the other hands, $$\lambda p(i) \frac{B(i)^{n-1}}{g_0}$$

is always less than $\mu$. Combining these two gives $$f(i)^* = \left[B(i) - \left(\frac{\mu g_0}{\lambda np(i)}\right)^{\frac{1}{n-1}}\right]^+. \quad (8)$$

Noting that (7) and (8) are respectively increasing and decreasing functions of $\mu$, there is a unique $\mu$ satisfying Equation 10.

2) Proof of Corollary 1

According to Equation 12, the optimal prefetched bits $s_t^*(i)$ is derived from the optimal transmitted bits $b_t^*$ in Theorem 1. In addition, $f(i)^*$ in Theorem 1 is rewritten as $$p(i)(B(i)f(i)^*)^{n-1} = p(i)\left(B(i) - \sum_{t=1}^{T} s_t(i)^*\right)^{n-1} \le \frac{\mu^* g_0}{\lambda n}, \quad (9)$$

which is equivalent to Inequality 2 and Equation 11 at t=1. As a result, HPFP satisfies Equation 8 and Equation 9, completing the proof.

3) Proof of Theorem 2

This is the backward iteration. Consider t=1. Given channel gain $g_1$, branch probability p(i) and task status $l_1(i)$, the prefetcher decides the optimal prefetching vector $s^*_1=[s^*_1(1),\Lambda,s^*_1(L)]$ by solving the following optimization problem 4.1:

$$\underset{\{s_1(i)\}}{\text{minimize}} \lambda \frac{\left(\sum_{i=1}^{L} s_1(i)\right)^n}{g_1} + \lambda E\left[\frac{1}{g_0}\right]\sum_{i=1}^{L} p(i)(l_1(i) - s_1(i))^n, \quad \text{[Problem 4.1]}$$

$$\text{subject to } 0 \le s_1(i) \le l(i), \forall i.$$

Define the Lagragian function for P4.1 as $$L = \qquad (10)$$

$$\lambda \frac{\left(\sum_{i=1}^{L} s_1(i)\right)^n}{g_1} + \lambda E\left[\frac{1}{g_0}\right]\sum_{i=1}^{L} p(i)(l_1(i) - s_1(i))^n + \sum_{i=1}^{L} \mu(i)(s_1(i) - l_i(i))^n$$

Since the objective function of P4.1 is convex with respect to $s_1(i)$, the following KKT conditions are necessary and sufficient for optimality:

$$2\frac{\partial L}{\partial s_1^*(i)} = \lambda n \frac{\left(\sum_{i}^{L} s_1^*(i)\right)^{n-1}}{g_1} - \lambda n E\left[\frac{1}{g_0}\right] p(i)(l_1(i) - s_1^*(i))^{n-1} + \mu(i) \ge 0, \quad (11)$$

$$\forall i,$$

$$s_1^*(i)\left(\lambda n \frac{\left(\sum_{i}^{L} s_1^*(i)\right)^{n-1}}{g_1} - \lambda n E\left[\frac{1}{g_0}\right] p(i)(l_1(i) - s_1^*(i))^{n-1} + \mu(i)\right) = 0, \forall i, \quad (12)$$

$$\mu(i)(s_1^*(i) - l_1(i)) = 0, \forall i, \quad (13)$$

If $\mu(i)$ is positive, $s^*_1(i)$ becomes equal to $l_1(i)$ according to (13), but condition (12) is violated. The optimal Lagragian multiplier $\mu(i)^*$ is thus zero for all i.

When $s^*_1(i)$ is zero, condition (90) are strictly positive and we have $$l_1(i) < \sum_{i=1}^{L} s_1^*(i)\left(g_1 E\left[\frac{1}{g_0}\right] p(i)\right)^{-\frac{1}{n-1}}. \quad (14)$$

Otherwise, $$l_1(i) - s_1^*(i) = \left(\sum_{i=1}^{L} s_1^*(i)\right)\left(g_1 E\left[\frac{1}{g_0}\right] p(i)\right)^{-\frac{1}{n-1}} \quad (15)$$

Combining (14) and (15) leads to $$p(i)^{\frac{1}{n-1}}(l_1(i) - s_1^*(i)) \le \left(\sum_{i=1}^{L} s_1^*(i)\right)\left(g_1 E\left[\frac{1}{g_0}\right]\right)^{-\frac{1}{n-1}} \quad (16)$$

Noting $l_1(i)=B(i)-\Sigma_{t=2}^{T} s^*_t(i)$, we complete the proof.

4) Proof of Corollary 2

If both tasks i and j are prefetched but tasks k is not, the following condition is satisfied:

$$p(i)^{\frac{1}{n-1}}\left(B(i) - \sum_{t=1}^{T} s_t^*(i)\right) = p(j)^{\frac{1}{n-1}}\left(B(j) - \sum_{t=1}^{T} s_t^*(j)\right) > p(k)^{\frac{1}{n-1}} B(k), \quad (17)$$

which is equivalent to conditions Inequality 2 and Equation 11 at t=1.

5) Proof of Theorem 3

At $t=1$, the optimal transmitted bits is already derived as Equation 16. Consider t=2. Given A, the cost-to-go function $\bar{J}_1(l_1)$ is $$\bar{J}_1(l_1) = E_{g_1}[J_1(l_1, g_1)] = \frac{\lambda\left(\sum_{k \in A} l_1(k)\right)^n}{\xi_1(A)} + \lambda E\left[\frac{1}{g}\right]\left(\sum_{i \notin A} p(i) l_1(i)^n\right). \quad (18)$$

Inserting (18) into P4 of t=2 gives $$J_2(l_2, g_2) = \qquad (P4.2)$$

$$\underset{s_2}{\text{minimize}}\left(\lambda \frac{\left(\sum_{k \in A} s_2(k)\right)^n}{g_2} + \bar{J}_1(l_2 - s_2)\right) + \lambda E\left[\frac{1}{g}\right]\left(\sum_{i \notin A} p(i) l_1(i)^n\right) =$$

$$\underset{s_2}{\text{minimize}}\left(\lambda \frac{\left(\sum_{k \in A} s_2(k)\right)^n}{g_2} + \frac{\lambda\left(\sum_{k \in A} l_2(k) - \sum_{k \in A} s_2(k)\right)^n}{\xi_1(A)}\right) +$$

$$\lambda E\left[\frac{1}{g}\right]\left(\sum_{i \notin A} p(i) l_1(i)^n\right)$$

Noting that the last term in P4.2 is independent of finding $s_2$, we can make an equivalent cost-to-go function $V_2(l_2) = E_{g_2}[V_2(l_2, g_2)]$ as $$V_2(l_2, g_2) = \underset{b_2}{\text{minimize}}\left(\lambda \frac{b_2^n}{g_2} + \frac{\lambda\left(\sum_{k \in A} l_2(k) - b_2\right)^n}{\xi_1(A)}\right), \quad (P4.3)$$

and the optimal $b^*_2$ of P4.3 is $$b_2^* = \frac{g_2^{\frac{1}{n-1}} \sum_{k \in A} l_2(k)}{g_2^{\frac{1}{n-1}} + \left(\frac{1}{\xi_1(A)}\right)^{-\frac{1}{n-1}}}. \quad (19)$$

Using the backward iteration, we can make the following optimization problem as Equation 16.

$$\underset{b_t}{\text{minimize}}\left(\lambda \frac{b_t^n}{g_t} + \frac{\lambda(\beta_t(A) - b_t)^n}{\xi_{t-1}(A)}\right), \quad (P4.3)$$

Noting that the optimum solution of (P4.3) is Equation 16, completing the proof.

Device Configuration According to Embodiments of the Present Invention

Figure 10:
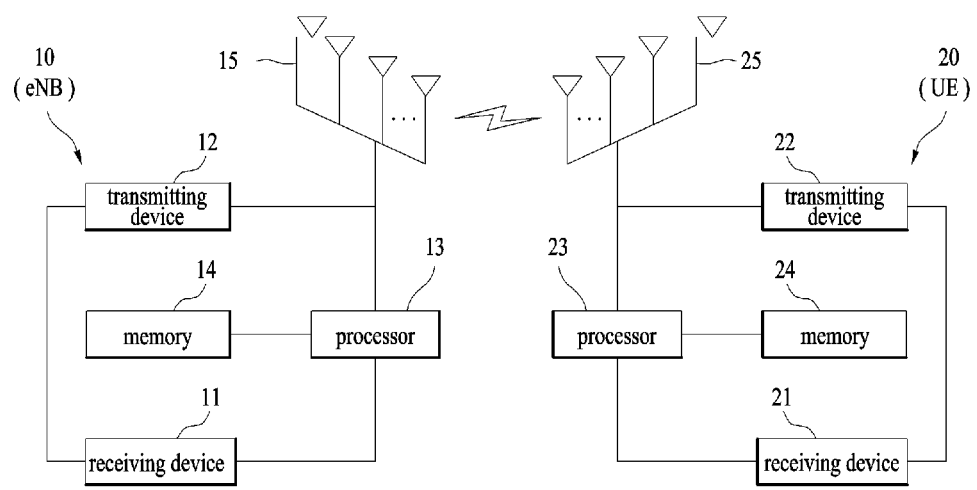
FIG. 10 is a diagram illustrating configurations of a transmission point device and a user equipment device.

FIG. 10 is a diagram illustrating configurations of a transmission point device and a user equipment device according to embodiments of the present invention.

Referring to FIG. 10, a transmission point device 10 according to the present invention may include a receiving device 11, a transmitting device 12, a processor 12, a memory 14 and a plurality of antennas 15. The plurality of the antennas 15 may mean that the transmission point device supports MIMO transmission and reception. The receiving device 11 can receive various signals, data and information in uplink from a user equipment. The transmitting device 12 can transmit various signals, data and information in downlink to the user equipment. And, the processor 12 can control overall operations of the transmission point device 10.

The processor 12 of the transmission point device 10 according to one embodiment of the present invention can handle the details required in each of the embodiments mentioned in the foregoing description.

The processor 12 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 10, a user equipment device 20 according to the present invention may include a receiving device 21, a transmitting device 22, a processor 23, a memory 24 and a plurality of antennas 25. The plurality of the antennas 15 may mean that the transmission point device supports MIMO transmission and reception. The receiving device 21 can receive various signals, data and information in downlink from an eNB. The transmitting device 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 10 may be equally applied to a relay node device as a downlink transmission entity or an uplink reception entity. And, the description of the user equipment device 20 in FIG. 10 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by devices, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

REFERENCES USED IN THE SPECIFICATION

<1> S. Sardellitti, G. Scutari, and S. Barbarossa, "Joint optimization of radio and computational resources for multicell mobile-edge computing," IEEE Trans. Signal and Info. Processing over Nectworks, June 2015.

<2> L. Benini, A. Bogliolo, G. Paleologo, and G. De Micheli, "Policy optimization for dynamic power management," IEEE Trans. Computer-Aided Design of Integrated Cir. and Sys., vol. 18, no. 6, pp. 813-833, 1999.

<3> D. P. Bertsekas, D. P. Bertsekas, D. P. Bertsekas, and D. P. Bertsekas, Dynamic programming and optimal control, vol. 1. Athena Scientific Belmont, Mass., 1995.

<4> W. C. Brown, "The history of power transmission by radio waves," IEEE Trans. Microwave Theory and Techniques, vol. 32, no. 9, pp. 1230-1242, September 1984.

<5> T. C. Chou and J. Abraham, "Load balancing in distributed systems," IEEE Trans. Softw. Eng, vol. SE-8, pp. 401-412, July 1982.

<6> H. T. Dinh, C. Lee, D. Niyato, and P. Wang, "A survey of mobile cloud computing: architecture, applications, and approaches," Wireless communications and mobile computing, vol. 13, no. 18, pp. 1587-1611, 2013.

<7> L. Gkatzikis and I. Koutsopoulos, "Migrate or not? Exploiting dynamic task migration in mobile cloud computing systems," IEEE Trans. Wireless Commun., vol. 20, pp. 24-32, June 2013.

<8> B. Gurakan, O. Ozel, J. Yang, and S. Ulukus, "Energy cooperation in energy harvesting wireless communications," in Proc. IEEE Intl. Symp. Info. Theory, pp. 965-969, 2012.

<9> K. Huang and X. Zhou, "Cutting last wires for mobile communication by microwave power transfer," IEEE Commun. Mag., vol. 53, pp. 86-93, June 2015.

<10> K. Huang and V. K. Lau, "Enabling wireless power transfer in cellular networks: Architecture, modeling and deployment," IEEE Trans. Wireless Commun., vol. 13, pp. 902-912, February 2014.

<11> S. Kosta, A. Aucinas, P. Hui, R. Mortier, and X. Zhang, "ThinkAir: Dynamic resource allocation and parallel execution in the cloud for mobile code offloading," in Proc. IEEE INFOCOM, pp. 945-953, 2012.

<12> T. Le, K. Mayaram, and T. Fiez, "Efficient far-field radio frequency energy harvesting for passively powered sensor networks," IEEE Journal of Solid-State Circuits, vol. 43, no. 5, pp. 1287-1302, 2008.

<13> J. Lee and N. Jindal, "Energy-efficient scheduling of delay constrained traffic over fading channels," vol. 8, pp. 1866-1875, April 2009.

<14> S. Lee, R. Zhang, and K. Huang, "Opportunistic wireless energy harvesting in cognitive radio networks," IEEE Trans. Wireless Commun., vol. 12, pp. 4788-4799, September 2013.

<15> M. Lin, A. Wireman, L. L. H. Andrew, and E. Thereska, "Dynamic right-sizing for power-proportional data centers," IEEE Trans. Networking, vol. 21, no. 5, pp. 1378-1397, October 2013.

<16> M. Swan, "Sensor mania! The internet of things, wearable computing, objective metrics, and the quantified self 2.0," J. Sens. Actuator Networks, vol. 1, pp. 217-253, 2012.

<17> D. W. Ng, E. S. Lo, and R. Schober, "Wireless information and power transfer: Energy efficiency optimization in OFDMA systems," IEEE Trans. Wireless Commun., vol. 12, pp. 6352-6370, December 2013.

<18> O. Ozel, K. Tutuncuoglu, J. Yang, S. Ulukus, and A. Yener, "Transmission with energy harvesting nodes in fading wireless channels: Optimal policies," IEEE J. Select. Areas Commun., vol. 29, pp. 1732-1743, August 2011.

<19> P. Pillai and K. G. Shin, "Real-time dynamic voltage scaling for low-power embedded operating systems," in Proc. ACM SIGOPS Operating Sys. Review, vol. 35, pp. 89-102, 2001.

<20> B. Prabhakar, E. Uysal Biyikoglu, and A. El Gamal, "Energy-efficient transmission over a wireless link via lazy packet scheduling," in Proc. IEEE INFOCOM, vol. 1, pp. 386-394, 2001.

<21> A. P. Chandrakasan, S. Sheng, and R. W. Brodersen, "Low-power CMOS digital design," IEICE Trans. Electron., vol. 75, no. 4, pp. 371-382, 1992.

<22> N. Shinohara, Wireless power transfer via radiowaves. John Wiley & Sons, 2014.

<23> H. Sun, Y-x. Guo, M. He, and Z. Zhong, "Design of a high-efficiency 2.45-GHz rectenna for low-input-power energy harvesting," IEEE Antennas and Wireless Propagation Letters, vol. 11, pp. 929-932, 2012.

<24> L. Yang, J. Cao, Y. Yuan, A. Han, and A. Chan, "A framework for partitioning and execution of data stream applications in mobile cloud computing," ACM SPER, vol. 40, no. 4, pp. 23-32, March 2013.

<25> L. Yang, J. Cao, and Y. Cheng, Hui adn Ji, "Multi-user computation partitioning for latency sensitive mobile cloud applications," IEEE Trans. Compers, vol. 64, no. 8, pp. 2253-2266, November 2014.

<26> F. Yao, A. Demers, and S. Shenker, "A scheduling model for reduced CPU energy," in Proc. IEEE Ann. Symp. Foundations of Computer Science, pp. 374-382, 1995.

<27> W. Zhang, Y. Wen, K. Guan, D. Kilper, H. Luo, and D. Wu, "Energy-optimal mobile cloud computing under stochastic wireless channel," vol. 12, pp. 4569-4581, September 2013.

<28> Y. Zhang, H. Liu, L. Jiao, and X. Fu, "To offload or not to offload: An efficient code partition algorithm for mobile cloud computing," in Proc. IEEE Intl. Conf. Cloud Networking, pp. 80-86, 2012.

<29> R. Zhang and C. Ho, "MIMO broadcasting for simultaneous wireless information and power transfer," IEEE Trans. Wireless Commun., vol. 12, pp. 1989-2001, May. 2013.

<30> Y. Zhang, D. Niyato, and P. Wang, "Offloading in mobile cloudlet systems with intermittent connectivity," IEEE Trans. Mobile Computing, vol. 14, no. 12, pp. 2516-2529, February 2015.

<31> S. Bi, C. K. Ho, and R. Zhang, "Wireless powered communication: Opportunities and challenges," IEEE Commun. Mag., vol. 53, pp. 117-125, April 2014.

<32> T. D. Burd and R. W. Brodersen, "Processor design for portable systems," J. VLSI Signal Process, pp. 203-221, August 1996.

<33> E. Cuervo, A. Balasubramanian, D.-k. Cho, A. Wolman, S. Saroiu, R. Chandra, and P. Bahl, "MAUI: Making smartphones last longer with code offload," in Proc. ACM MobiSys, pp. 49-62, June 2010.

<34> J. A. Hagerty, T. Zhao, R. Zane, and Z. Popovic, "Efficient broadband RF energy harvesting for wireless sensors," in Proc. GOMACTech, pp. 1-4, 2005.

<35> D. Huang, P. Wang, and D. Niyato, "A dynamic offloading algorithm for mobile computing," IEEE Trans. Wireless Commun., vol. 11, no. 6, pp. 1991-1995, June 2012.

<36> K. Kumar, J. Liu, Y.-H. Lu, and B. Bhargava, "A survey of computation offloading for mobile systems," Mobile Networks and Applications, vol. 18, no. 1, pp. 129-140, 2013.

<37> K. Kumar and Y.-H. Lu, "Cloud computing for mobile users: Can offloading computation save energy?," IEEE Computer, no. 4, pp. 51-56, 2010.

<38> J. R. Lorch and A. J. Smith, "Improving dynamic voltage scaling algorithms with pace," in Proc. ACM SIGMETRICS, vol. 29, pp. 50-61, June 2001.

<39> A. A. Nasir, X. Zhou, S. Durrani, and R. A. Kennedy, "Relaying protocols for wireless energy harvesting and information processing," IEEE Trans. Wireless Commun., vol. 12, pp. 3622-3636, July 2013.

<40> P. Popovski, A. M. Fouladgar, and O. Simeone, "Interactive joint transfer of energy and information," IEEE Trans. Commun., vol. 61, pp. 2086-2097, May. 2013.

<41> C. Shi, K. Habak, P. Pandurangan, M. Ammar, M. Naik, and E. Zegura, "COSMOS: Computation offloading as a service for mobile devices," in Proc. ACM MobiHoc, pp. 287-296, August 2014.
<42> W. Yuan and K. Nahrstedt, "Energy-efficient soft real-time CPU scheduling for mobile multimedia systems," ACM Trans. Computer Sys., vol. 37, no. 5, pp. 149-163, 2003.
[43] W. Zhang, Y. Wen, and D. O. Guan, "Collaborative task execution in mobile cloud computing under a stochastic wireless channel," IEEE Trans. Wireless Commun., vol. 14, no. 1, pp. 81-93, June 2014.
[44] W. Zhang, Y. Wen, K. Guan, D. Kilper, H. Luo, and D. O. Wu, "Energy-optimal mobile cloud computing under stochastic wireless channel," IEEE Trans. Wireless Commun., vol. 12, no. 9, pp. 4569-4581, September 2013.

INDUSTRIAL APPLICABILITY

The above-described embodiments of the present invention can be applied to various kinds of mobile communication systems.

The invention claimed is:

1. A method of a wireless prefetching of an user equipment (UE) for a program comprising a plurality of stages including at least one task, in a wireless communication system, the method comprising:
receiving a broadcast message including a list of supported service;
transmitting a RRCConnectionRequest message to an eNB with a establishmentCause as computation offloading for a program of a service included in the list;
receiving a RRCConnectionSetupComplete in response to the RRCConnectionRequest;
transmitting bits for a first task that is necessary for stage K;
transmitting bits for a second task that is included in stage K+1 before completion of the stage K; and,
receiving a result for the stage K and for the second task.

2. The method of claim 1, wherein whether the second task is necessary task for the stage K+1 is determined after completion of the stage K.

3. The method of claim 1, wherein the UE receives a RRCConnectionReconfiguration message for the bits for the second task.

4. The method of claim 3, wherein the RRCConnectionReconfiguration message includes a packet size configuration, the number of packet for prefetching and computation time for one task.

5. The method of claim 1, wherein if the second task is necessary task for the stage K+1, the UE uses the result for the second task, and
wherein if the second task is not necessary task for the stage K+1, the UE abandon the result for the second task.

6. An user equipment (UE) performing a wireless prefetching for a program comprising a plurality of stages including at least one task, in a wireless communication system, the UE comprising:
a receiving device;
a transmitting device; and
a processor,
wherein the processor is configured to
receive a broadcast message including a list of supported service,
transmit a RRCConnectionRequest message to an eNB with a establishmentCause as computation offloading for a program of a service included in the list,
receive a RRCConnectionSetupComplete in response to the RRCConnectionRequest,
transmitting bits for a first task that is necessary for stage K,
transmit bits for a second task that is included in stage K+1 before completion of the stage K and
receive a result for the stage K and for the second task.

7. The UE of claim 6, wherein whether the second task is necessary task for the stage K+1 is determined after completion of the stage K.

8. The UE of claim 6, wherein the UE receives a RRCConnectionReconfiguration message for the bits for the second task.

9. The UE of claim 8, wherein the RRCConnectionReconfiguration message includes a packet size configuration, the number of packet for prefetching and computation time for one task.

10. The UE of claim 6, wherein if the second task is necessary task for the stage K+1, the UE uses the result for the second task, and
wherein if the second task is not necessary task for the stage K+1, the UE abandon the result for the second task.

* * * * *